(12) United States Patent
Arthurs et al.

(10) Patent No.: US 9,631,761 B1
(45) Date of Patent: Apr. 25, 2017

(54) TOILET DRAIN LINE CAP

(71) Applicants: Thomas A. Arthurs, Naples, FL (US);
Jody A. Arthurs, Naples, FL (US)

(72) Inventors: Thomas A. Arthurs, Naples, FL (US);
Jody A. Arthurs, Naples, FL (US)

(*) Notice: Subject to any disclaimer, the term of this patent is extended or adjusted under 35 U.S.C. 154(b) by 0 days.

(21) Appl. No.: 14/963,618

(22) Filed: Dec. 9, 2015

Related U.S. Application Data

(63) Continuation-in-part of application No. 14/691,935, filed on Apr. 21, 2015, now abandoned.

(51) Int. Cl.
| | | |
|---|---|---|
| *F16L 55/10* | (2006.01) | |
| *F16L 55/115* | (2006.01) | |
| *E03D 11/13* | (2006.01) | |

(52) U.S. Cl.
CPC .......... *F16L 55/115* (2013.01); *E03D 11/13* (2013.01)

(58) Field of Classification Search
CPC ......... F16L 55/115; E03D 11/13; E03D 11/16
USPC .......... 138/89, 96 R; 215/306, 270; 220/803, 220/804
See application file for complete search history.

(56) References Cited

U.S. PATENT DOCUMENTS

| | | | |
|---|---|---|---|
| 1,120,369 A * | 12/1914 | Booraem | F16B 37/043 16/42 T |
| 1,546,159 A * | 7/1925 | Wippler, Sr. | B65D 41/225 215/320 |
| 2,295,658 A * | 9/1942 | Hogg | B65D 41/12 215/254 |
| 3,179,287 A | 4/1965 | Rickmeier, Jr. | 220/324 |
| 3,200,984 A * | 8/1965 | Fueslein | B65D 59/02 138/89 |
| 3,391,905 A | 7/1968 | Burns | |
| 3,574,312 A * | 4/1971 | Miller | B65D 59/00 138/89 |
| 3,745,974 A | 7/1973 | Karasz | 294/1.3 |
| 3,821,969 A * | 7/1974 | Sinko | B65D 59/02 138/89 |
| 3,958,572 A * | 5/1976 | Lawhead | B01L 3/50825 215/247 |
| 4,210,255 A * | 7/1980 | Pan | B65D 51/1644 215/260 |
| 4,503,934 A * | 3/1985 | Stephanus | F01M 11/0408 138/89 |
| 5,074,572 A | 12/1991 | Delmerico et al. | |
| 5,127,425 A * | 7/1992 | Cornwall | A62C 2/06 137/1 |
| 5,184,653 A | 2/1993 | Lacy | |
| 5,228,145 A * | 7/1993 | Osmond | E03D 1/08 4/370 |
| 5,243,714 A * | 9/1993 | Osmond | E03D 1/08 4/370 |
| 5,373,593 A | 12/1994 | Decky et al. | |
| 5,505,430 A | 4/1996 | Barnett | |
| 5,556,076 A | 9/1996 | Jacquay | |
| 6,085,363 A * | 7/2000 | Huber | E03D 11/16 138/90 |
| 6,135,466 A | 10/2000 | Irwin | |
| 6,254,152 B1 | 7/2001 | Tillett | 294/15 |
| 6,685,170 B1 | 2/2004 | Gwynn | |

(Continued)

*Primary Examiner* — Patrick F Brinson
(74) *Attorney, Agent, or Firm* — Livingston Loeffler, P.A.; Edward M. Livingston, Esq.; Bryan L. Loeffler, Esq.

(57) ABSTRACT

A drain line cap (1) used after a toilet is removed from the sewer drain to prevent gas and odor from escaping from the sewer drain and into a bathroom.

3 Claims, 1 Drawing Sheet

(56) References Cited

U.S. PATENT DOCUMENTS

| | | |
|---|---|---|
| 6,688,336 B2 * | 2/2004 | Trichard ............. F16L 55/1108 |
| | | 138/89 |
| 6,752,379 B1 | 6/2004 | Wall |
| 7,058,996 B1 | 6/2006 | Merrill |
| 7,107,632 B2 | 9/2006 | Huff et al. |
| 7,231,674 B1 | 6/2007 | Cernik |
| 7,762,282 B2 * | 7/2010 | Coscarella ............ F16L 55/115 |
| | | 138/89 |
| 7,798,469 B2 | 9/2010 | Junca |
| 7,823,862 B2 | 11/2010 | Wakil |
| 8,312,608 B2 | 11/2012 | Head |
| 8,313,130 B2 | 11/2012 | Hazel |
| 2008/0109957 A1 | 5/2008 | Blancke |
| 2008/0174134 A1 | 7/2008 | Niezur et al. .................. 294/158 |

* cited by examiner

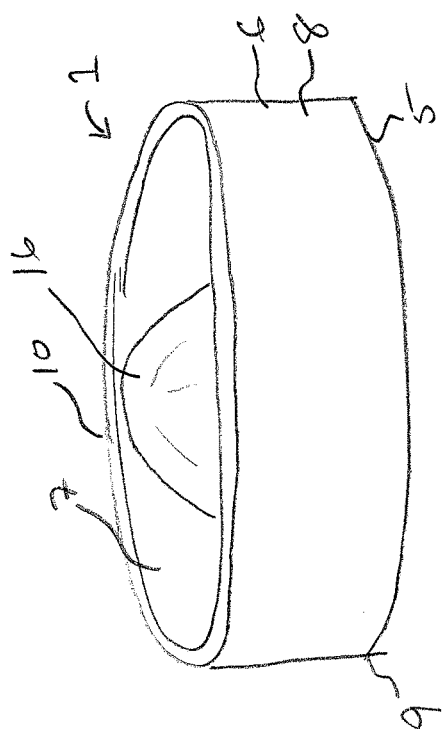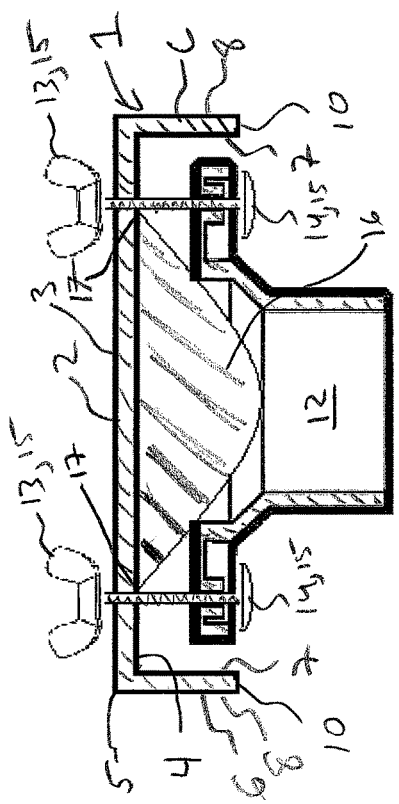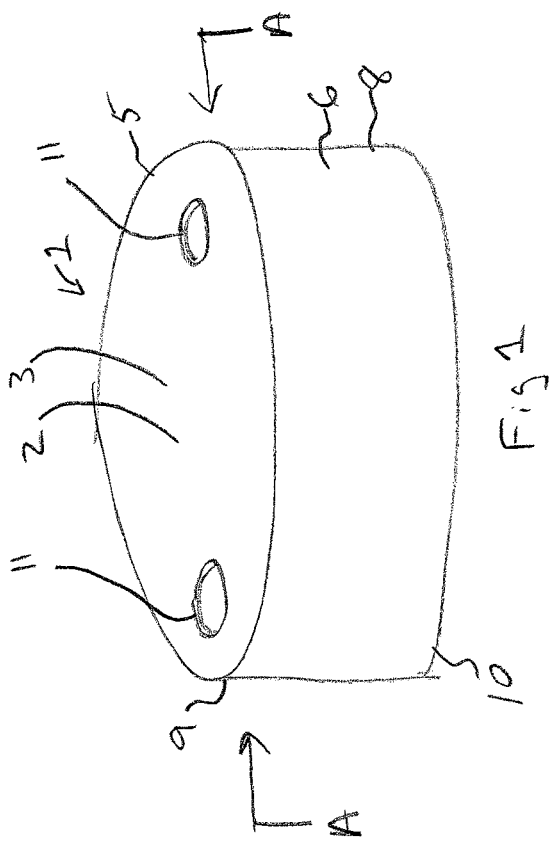

TOILET DRAIN LINE CAP

CROSS-REFERENCE TO RELATED APPLICATIONS

This application is a continuation-in-part application of U.S. patent application Ser. No. 14/691,935 filed on Apr. 21, 2015 which is currently pending. The patent application identified above is incorporated herein by reference in its entirety to provide continuity of disclosure.

FIELD OF THE INVENTION

This invention relates to the removal of toilets from homes and other buildings, more particularly, to a cap used to temporarily seal a toilet drain line to prevent the release of sewer gas into an interior space.

BACKGROUND OF THE INVENTION

Toilet drain lines are commonly left exposed and open after initial installation in new construction and after a toilet has been removed during remodeling of bathroom. However, open drain lines can allow sewer gas to be released into the bathroom and other interior spaces of a home or structure. In addition, foreign objects or debris can fall into the open drain line causing clogs and/or damage to the drain line.

Plumbers and other individuals currently try to block the drain line by shoving a rag in the open end or taping a plastic bag on the end of the drain line. However, rags can become clogged in the drain lines and gasses may still escape using both of these solutions. In addition, the end of the drain line is still exposed to damage from objects, such as tubs, vanities and so forth, being moved in the bathroom and hitting the drain line.

Therefore, a need exists for a drain line cap that temporarily attaches to the end of the toilet drain line to prevent gasses from escaping from the drain line and damage to the end of the drain line.

SUMMARY OF THE INVENTION

The primary object of the present invention is to provide a drain line cap that temporarily attaches to the end of the toilet drain line to prevent gasses from escaping from the drain line and damage to the end of the drain line.

The present invention fulfills the above and other objects by providing a drain line cap to be used after a toilet is removed from the sewer drain to prevent gas and odor from escaping from the sewer drain and into a bathroom. The drain line cap has a preferably circular-shaped upper panel and a perimeter wall that fits over a toilet drain flange. A gasket may be located on the bottom surface of the upper panel to create a seal between the drain line cap and the toilet drain flange. In addition or alternatively, a gasket may be located along a lower edge of the perimeter wall and/or on an inner surface of the perimeter wall to create a seal between the drain line cap and the toilet drain flange. The drain line cap may be secured to the toilet drain flange using nuts and bolts similar to the method used to secure a toilet to the toilet drain flange. The drain line cap may also be secured using a friction fit created by the gasket and/or the perimeter wall and the toilet drain flange. The drain line cap may also have posts extending downward from a bottom surface of the panel that terminate with circular heads (similar to bolt heads) that will engage apertures and slots in the toilet drain flange, thereby allowing the drain line cap to be locked onto the toilet drain flange.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 1 is a top perspective view of a drain line cap of the present invention;

FIG. 2 is a bottom perspective view of a drain line cap of the present invention; and FIG. 3 is a cross sectional view along line A-A of FIG. 1 of a drain line cap of the present invention installed on a toilet drain flange.

DESCRIPTION OF THE PREFERRED EMBODIMENTS

For purposes of describing the preferred embodiment, the terminology used in reference to the numbered accessories in the drawings is as follows:

1. drain line cap
2. upper panel
3. top surface of upper panel
4. bottom surface of upper panel
5. perimeter edge of upper panel
6. perimeter wall
7. inner surface of perimeter wall
8. outer surface of perimeter wall
9. top edge of perimeter wall
10. bottom edge of perimeter wall
11. aperture
12. toilet drain flange
13. nut
14. bolt
15. attachment means
16. gasket
17. outer edge of gasket With reference to FIGS. 1-3, a drain line cap 1 of the present invention is illustrated. The drain line cap 1 may be used after a toilet is removed from the sewer drain to prevent gas and odor from escaping from the sewer drain line and into a bathroom. The drain line cap 1 has a preferably circular-shaped upper panel 2 having a top surface 3, a bottom surface 4 and a perimeter edge 5. A perimeter wall 6 having an inner surface 7, an outer surface 8, a top edge 9 and a bottom edge 10 extends downward from the perimeter edge 5 of the upper panel 2. Apertures 11 are preferably located in the upper panel 2 and are used to secure the drain line cap 1 to a conventional toilet drain flange 12 using nuts 13 and bolts 14 similar to the method commonly used to secure a toilet to a toilet drain flange 12, as illustrated in FIG. 3. Alternatively, the drain line cap 1 may attach to the toilet drain flange 12 via a friction fit or other attachment means 15, such as posts extending downward from the bottom surface 4 of the upper panel 2 that terminate with circular heads (similar to bolt heads) that will engage apertures and slots in the toilet drain flange 12, thereby allowing the drain line cap 1 to be locked onto the toilet drain flange 12.

With reference to FIG. 3, a cross sectional view along line A-A of FIG. 1 is illustrated in which a gasket 16 is located on the bottom surface 4 of the upper panel 2. As illustrated here, the gasket 16 is a round spherical projection extending downward from the bottom surface 4 of the upper panel 2. The gasket 16 is preferably made of a resilient material, such as rubber, sponge and so forth, that will compress into the opening of the toilet drain flange 12 to create a tight seal between the drain line cap 1 and the toilet drain flange 12. The gasket 16 may have an outer edge 17 that terminated prior to the location of the apertures 11 so that it will not interfere with the attachment means 15 of the drain line cap 1.

A gasket may also be located along the bottom edge 10 of the perimeter wall 6 and/or on the inner surface 7 of the perimeter wall 6 to create a seal between the drain line cap 23 and a toilet drain flange 12.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described our invention, we claim:

1. A drain line cap comprising:
a circular-shaped upper panel having a top surface, a bottom surface and a perimeter edge;
a perimeter wall extending downward perpendicularly from the perimeter edge of the upper panel beyond the bottom surface;
said perimeter wall having an inner surface, an outer surface and a bottom edge;
at least two apertures located in the upper panel;
a circular-shaped gasket located on the bottom surface of the upper panel;
said gasket has an outer edge that terminates prior to the perimeter edge of the upper panel, thereby leaving a portion of the bottom surface of the upper panel located between the outer edge of the gasket and the perimeter edge of the upper panel exposed;
said at least two apertures are located between the outer edge of the gasket and the perimeter edge of the upper panel in the exposed portion of the bottom surface of the upper panel located between the outer edge of the gasket and the perimeter edge of the upper panel;
said gasket is a round spherical projection extending downward from the bottom surface of the upper panel; and
said gasket is made of a resilient material.

2. A drain line cap comprising:
a circular-shaped upper panel having a top surface, a bottom surface and a perimeter edge;
a perimeter wall extending downward perpendicularly from the perimeter edge of the upper panel beyond the bottom surface;
said perimeter wall having an inner surface, an outer surface and a bottom edge;
at least two apertures located in the upper panel;
a circular-shaped gasket located on the bottom surface of the upper panel;
said gasket has an outer edge that terminates prior to the perimeter edge of the upper panel, thereby leaving a portion of the bottom surface of the upper panel located between the outer edge of the gasket and the perimeter edge of the upper panel exposed;
said at least two apertures are located between the outer edge of the gasket and the perimeter edge of the upper panel in the exposed portion of the bottom surface of the upper panel located between the outer edge of the gasket and the perimeter edge of the upper panel;
said gasket is a round projection extending downward from the bottom surface of the upper panel; and
said gasket is made of a resilient material.

3. A drain line cap comprising:
a circular-shaped upper panel having a top surface, a bottom surface and a perimeter edge;
a perimeter wall extending downward perpendicularly from the perimeter edge of the upper panel beyond the bottom surface;
said perimeter wall having an inner surface, an outer surface and a bottom edge;
at least two apertures located in the upper panel;
a circular-shaped gasket located on the bottom surface of the upper panel;
said gasket has an outer edge that terminates prior to the perimeter edge of the upper panel, thereby leaving a portion of the bottom surface of the upper panel located between the outer edge of the gasket and the perimeter edge of the upper panel exposed;
said at least two apertures are located between the outer edge of the gasket and the perimeter edge of the upper panel in the exposed portion of the bottom surface of the upper panel located between the outer edge of the gasket and the perimeter edge of the upper panel;
said gasket is a round projection extending downward from the bottom surface of the upper panel to a central point that is placed over a center of a drain line; and
said gasket is made of a resilient material.

* * * * *